United States Patent
Miyazaki et al.

(10) Patent No.: US 9,054,388 B2
(45) Date of Patent: Jun. 9, 2015

(54) ENERGY STORAGE DEVICE, WINDING APPARATUS, AND WINDING METHOD

(71) Applicant: GS Yuasa International, Ltd., Kyoto (JP)

(72) Inventors: Akihiko Miyazaki, Kyoto (JP); Sumio Mori, Kyoto (JP); Tomonori Kako, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 39 days.

(21) Appl. No.: 13/864,133

(22) Filed: Apr. 16, 2013

(65) Prior Publication Data
US 2013/0280568 A1    Oct. 24, 2013

(30) Foreign Application Priority Data

Apr. 18, 2012 (JP) .................................. 2012-095061
Mar. 29, 2013 (JP) .................................. 2013-074194

(51) Int. Cl.
| | |
|---|---|
| H01M 4/00 | (2006.01) |
| H01M 10/04 | (2006.01) |
| H01M 2/16 | (2006.01) |
| H01M 10/0587 | (2010.01) |

(52) U.S. Cl.
CPC ...... *H01M 10/0431* (2013.01); *Y10T 29/49114* (2015.01); *Y10T 29/53135* (2015.01); *H01M 2/1686* (2013.01); *H01M 10/0468* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 2005/0053830 A1* | 3/2005 | Akashi et al. ................. | 429/144 |
| 2006/0024570 A1* | 2/2006 | Zhu ............................... | 429/144 |
| 2009/0067119 A1* | 3/2009 | Katayama et al. ............ | 361/523 |
| 2012/0107656 A1* | 5/2012 | Tanizaki et al. .............. | 429/94 |
| 2012/0202103 A1* | 8/2012 | Yu et al. ........................ | 429/144 |

FOREIGN PATENT DOCUMENTS

| | | |
|---|---|---|
| JP | 11-250873 A | 9/1999 |
| JP | 2011-159434 A | 8/2011 |
| JP | 2011-175749 A | 9/2011 |

\* cited by examiner

*Primary Examiner* — Patrick Ryan
*Assistant Examiner* — Jose Colucci Rios
(74) *Attorney, Agent, or Firm* — McGinn IP Law Group, PLLC

(57) ABSTRACT

Provided is an energy storage device which employs the use of a separator provided with a layer having poor thermal properties such as a heat resistant coated layer and is capable of inhibiting a decrease in performance. The energy storage device includes: a wound body including a positive electrode, a negative electrode, and separators which are layered and wound, the separators being interposed between the positive electrode and the negative electrode and having a first surface and a second surface, the first surface having thermal bonding properties superior to thermal bonding properties of the second surface; and an insulation sheet wound around an outermost layer of the wound body. At least one of the separators is bonded to the insulation sheet via the first surface thereof.

20 Claims, 5 Drawing Sheets

ENERGY STORAGE DEVICE, WINDING APPARATUS, AND WINDING METHOD

CROSS REFERENCE TO RELATED APPLICATIONS

The present application is based on and claims priority of Japanese Patent Application No. 2012-095061 filed on Apr. 18, 2012 and Japanese Patent Application No. 2013-074194 filed on Mar. 29, 2013. The entire disclosure of the above-identified application, including the specification, drawings and claims is incorporated herein by reference in its entirety.

FIELD

The present invention relates to an energy storage device having a wound electrode assembly including a positive electrode, a negative electrode, and a separator which are alternately layered and wound, and to a winding apparatus for manufacturing the wound electrode assembly.

BACKGROUND

Conventional structures of energy storage devices including batteries such as lithium-ion batteries include wound electrode assemblies formed by winding a positive electrode, a negative electrode, and a separator which are alternately layered. In energy storage devices having such wound electrode assemblies, the separator is fixed at a winding end point on the outermost layer of the wound electrode assembly. The separator is fixed, for example, by thermal bonding or with tape. Here, thermal bonding is preferred as a fixing method in terms of durability within the internal environment of the battery and impact on battery performance.

For example, in Patent Literature 1 (PTL 1) (Japanese Unexamined Patent Application Publication No. 11-250873), a separator which protrudes out beyond an end surface of the wound electrode assembly that is perpendicular to the winding axis is fixed by being bonded with a seal of the battery case made from a laminate sheet.

SUMMARY

An energy storage device according to an aspect of the present invention includes: a wound body including a positive electrode, a negative electrode, and a separator which are layered and wound, the separator being interposed between the positive electrode and the negative electrode and having a first surface and a second surface, the first surface having thermal bonding properties superior to thermal bonding properties of the second surface; and an insulation sheet wound around an outermost layer of the wound body, wherein the separator is bonded to the insulation sheet via the first surface thereof

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
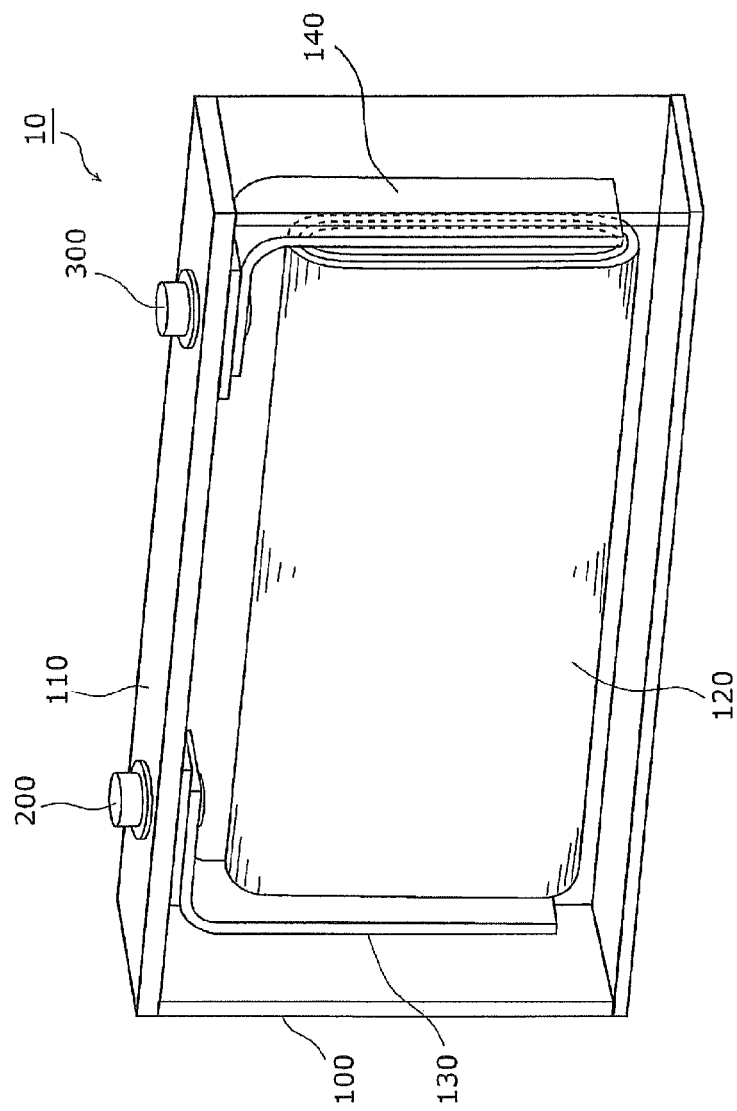
FIG. 1 is a perspective view where one of the walls of the container of the energy storage device according to the first embodiment of the present invention is omitted to schematically show the internal structure of a battery.

A separator can be designed to improve safety in the case of an internal short-circuit when the battery is in use, for example, by coating one side of the separator with a heat-resistant layer such as a heat-resistant filler (such a separator is hereinafter also referred to as a heat-resistant treated separator). When used in a wound electrode assembly, bonding of the heat-resistant layer on this kind of heat-resistant treated separator to the wound body at the winding end point on the outermost layer is difficult since the heat-resistant layer is resistant to thermal bonding, and difficult to maintain a state in which tension is applied to the wound electrode assembly by bonding. Due to this, the portion of the outermost layer of the wound electrode assembly can easily become slack, and a gap (distance) can easily form between the positive electrode and the negative electrode of the wound electrode assembly, contributing to a decrease in performance of the energy storage device.

The present invention has been made in view of the above problem, and aims to provide an energy storage device that employs the use of a separator provided with a layer having poor thermal bonding properties such as a heat resistant coated layer and that is capable of inhibiting a decrease in performance.

An energy storage device according to an aspect of the present invention includes: a wound body including a positive electrode, a negative electrode, and a separator which are layered and wound, the separator being interposed between the positive electrode and the negative electrode and having a first surface and a second surface, the first surface having thermal bonding properties superior to thermal bonding properties of the second surface; and an insulation sheet wound around an outermost layer of the wound body, wherein the separator is bonded to the insulation sheet via the first surface thereof.

With this, it is possible to easily attain a state in which tension is applied to at least one separator at a winding end point of the wound body since the wound body is bonded to the insulation sheet via the first surface of at least one of the separators, which is the surface that has superior thermal bonding properties. A state in which tension is applied to the wound body can be easily secured since if one end of the insulation sheet wound around the outermost layer of the wound body is thermally bonded to one of the separators, the other end of the insulation sheet can be bonded to the insulation sheet after, for example, it is wound around the wound body one more time. For this reason, a decrease in performance in the energy storage device can be inhibited.

Moreover, the energy storage device may include two of the separators, wherein the separators may be bonded together via the first surfaces thereof, and the first surface of one of the separators may be bonded to the insulation sheet.

With this, the two separators are bonded together via their respective first surfaces having the superior thermal bonding properties, and furthermore, the first surface of one of the two separators is bonded to the insulation sheet. In other words, one separator is directly bonded to the insulation sheet and the other separator is indirectly bonded to the insulation sheet via the one separator. With this, the two separators can be securely bonded to the insulation sheet.

Moreover, the first surface of the separator may be bonded to the insulation sheet in a state in which an end portion of the insulation sheet is sandwiched by the separator.

With this, the separator is bonded to the insulation sheet while the insulation sheet is sandwiched by the first surface of the separator having the superior thermal bonding properties. Consequently, the separator can be securely bonded to the insulation sheet.

Moreover, the first surface of each of the separators may be bonded to the insulation sheet in a state in which an end portion of the insulation sheet is sandwiched by the separators.

With this, the separators are bonded to the insulation sheet while the insulation sheet is sandwiched by the first surface of each of the separators having the superior thermal bonding properties. Consequently, the separators can be securely bonded to the insulation sheet.

Moreover, the insulation sheet may be wound at least once around an outer surface of the wound body and bonded to itself in an overlapping area.

With this, the end portion of the outermost layer of the insulation sheet wound around the wound body is bonded to the insulation sheet in an overlapping area of the insulation sheet. In other words, the insulation sheet is, for example, bonded to the separator at a first point at one end, and, while the insulation sheet is wound around the outermost layer of the wound body, bonded to the insulation sheet at the other end at a second point nearer the end of the winding than the first point is. This makes it possible to securely fix the end of the wound body with the insulation sheet by winding the insulation sheet having thermal bonding properties superior at least to those of the second surface of the separator around the outer most layer of the wound body once while one end of the insulation sheet is bonded to the separator then bonding the insulation sheet to itself.

Moreover, the insulation sheet may include a material having thermal bonding properties superior to the thermal bonding properties of the first surface.

With this, the thermal bonding properties of the insulation sheet are superior to the first surface of the separator, which has the superior thermal bonding properties. This allows the insulation sheet and the first surface of a separator to be bonded and the insulation sheet to be bonded to itself at a temperature lower than a temperature required to bond the separators together. This makes it possible to reduce a decrease in performance of the wound electrode assembly caused by application of heat since the amount of heat applied in the bonding process to the wound electrode assembly including the wound body is minimized.

Moreover, the separator may comprise two separators, and the two separators may be bonded together before the insulation sheet is wound around the wound body.

Moreover, the separator may include a base material layer and a heat-resistant layer including inorganic particles, the base material layer may form the first surface, and the heat-resistant layer may form the second surface.

It is to be noted that the present invention can be realized not only as this sort of energy storage device, but also as a winding apparatus or winding method for manufacturing this sort of energy storage device.

Hereinafter, embodiments of the present invention are described with reference to the Drawings. Each of the exemplary embodiments described below shows a general or specific example. The shapes, materials, structural elements, the arrangement and connection of the structural elements etc. shown in the following exemplary embodiments are mere examples, and therefore do not limit the scope of the appended Claims and their equivalents. The present invention is defined by the Claims. Therefore, among the structural elements in the following exemplary embodiments, structural elements not recited in any one of the independent claims are not a crucial requirement for achieving the aim of the present invention, but are described as further preferable embodiments.

First Embodiment

FIG. 1 is a perspective view where one of the walls of the container of the energy storage device is omitted to schematically show the internal structure of the battery.

An energy storage device 10 is a secondary battery capable of discharging and charging electricity, and more specifically is a non-aqueous electrolyte battery such as a lithium ion secondary battery.

As FIG. 1 shows, the energy storage device 10 includes a container 100, a positive electrode terminal 200, and a negative electrode terminal 300. The container 100 includes a cover 110 functioning as the top wall of the container 100. Moreover, an electrode assembly 120, a positive electrode current collector 130, and a negative electrode current collector 140 are included inside the container 100.

It is to be noted that even though it is not shown in the Drawings, the container 100 of the energy storage device 10 contains liquid such as an electrolyte. Moreover, the energy storage device 10 is not limited to a non-aqueous electrolyte battery. The energy storage device 10 may be a secondary battery other than a non-aqueous electrolyte battery, such as a capacitor.

The container 100 is configured of a rectangular tubular metal case having a bottom, and the cover 110 that is metallic and covers the opening of the case. Moreover, the inside of container 100 is sealed after insertion of the electrode assembly 120 and such by, for example, welding the cover 110 to the case.

The electrode assembly 120, a component that is capable of storing electricity, includes the positive electrode, the negative electrode, and the separator. Specifically, the electrode assembly 120 is formed by winding into an oblong shape a layered body of the negative electrode, the positive electrode, and the separator interposed therebetween. It is to be noted that in FIG. 1, the electrode assembly 120 is depicted as being oblong in shape, but the electrode assembly 120 may be circular or elliptical in shape. Details regarding the structure of the electrode assembly 120 will be disclosed later.

The positive electrode terminal 200 is an electrode terminal that is electrically connected to the positive electrode in the electrode assembly 120, and the negative electrode terminal 300 is an electrode terminal that is electrically connected to the negative electrode in the electrode assembly 120. In other words, the positive electrode terminal 200 and the negative electrode terminal 300 are metallic electrode terminals for leading electricity stored in the electrode assembly 120 out of the energy storage device 10 and guiding electricity into the energy storage device 10 to be stored in the electrode assembly 120. Moreover, the positive electrode terminal 200 and the negative electrode terminal 300 are attached to the cover 110 located above the electrode assembly 120.

The positive electrode current collector 130 is a rigid component having conductive properties that is electrically connected to the positive electrode terminal 200 and the positive electrode in the electrode assembly 120, and positioned between the positive electrode in the electrode assembly 120 and a side wall of the container 100. It is to be noted that the positive electrode current collector 130 and the positive electrode current collector foil in the electrode assembly 120 alike are made of aluminum or an aluminum alloy.

The negative electrode current collector 140 is a rigid component having conductive properties that is electrically connected to the negative electrode terminal 300 and the negative electrode in the electrode assembly 120, and positioned between the negative electrode in the electrode assembly 120 and a side wall of the container 100. It is to be noted that the negative electrode current collector 140 and the negative electrode current collector foil in the electrode assembly 120 are made of copper or a copper alloy.

Figure 2:
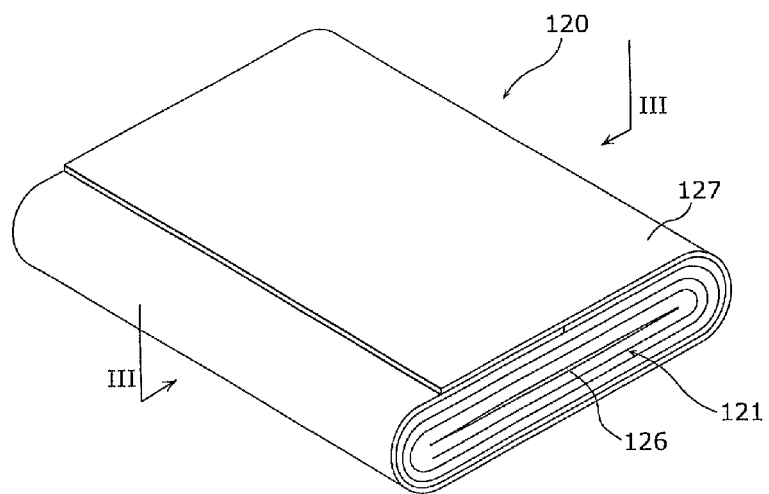
FIG. 2 is a perspective view schematically showing the external appearance of the electrode assembly.
Figure 3:
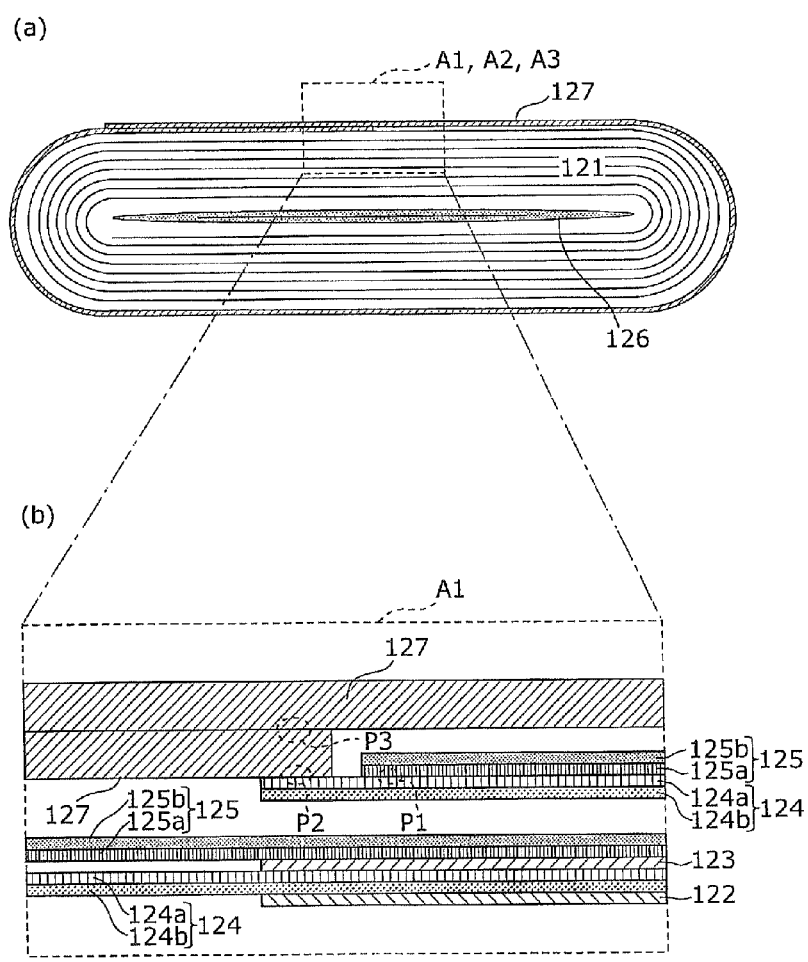
FIG. 3 is a cross section of the electrode assembly along shown in FIG. 2.

FIG. 2 is a perspective view schematically showing the external appearance of the electrode assembly. In FIG. 3, (a) is a cross section of the electrode assembly along shown in FIG. 2, and (b) is an expanded view of the portion A1 shown in (a) in FIG. 3.

The electrode assembly 120, which is a wound electrode assembly, is configured of a wound body 121 and an insulation sheet 127, as FIG. 2, and (a) and (b) in FIG. 3 show.

The wound body 121 is formed by winding the positive electrode 122 and the negative electrode 123 coated with active materials and the separators 124 and 125 each having two surfaces having different thermal bonding properties, in a state in which the positive electrode 122, the negative electrode 123, the separator 124, and the separator 125 are alternately layered. In other words, the wound body 121 is formed by winding the positive electrode 122, the first separator 124, the negative electrode 123, and the second separator 125 which are layered in this order, so that a cross section thereof is oblong in shape.

The positive electrode 122 is a long, belt-shaped positive electrode current collector sheet made of aluminum or an aluminum alloy that includes a positive electrode active material layer formed on the surface of the positive electrode current collector foil. It is to be noted that the positive electrode 122 used in the energy storage device 10 according to the present invention is not particularly different from conventional positive electrodes, and commonly used positive electrodes may be used as the positive electrode 122.

A polyanion compound such as $LiMPO_4$, $LiMSiO_4$, or $LiMBO_3$ (where M is one or more transition metal element selected from: Fe, Ni, Mn, Co and the like), a spinet compound such as lithium titanate or lithium maganate, or a lithium transition metal oxide such as $LiMO_2$ (where M is one or more transition metal element selected from: Fe, Ni, Mn, Co and the like), for example, can be used as the positive electrode active material.

The negative electrode 123 is a long, belt-shaped negative electrode current collector sheet made of copper or a copper alloy that includes a negative electrode active material layer formed on the surface of the negative electrode current collector foil. It is to be noted that the negative electrode 123 used in the energy storage device 10 according to the present invention is not particularly different from conventional negative electrodes, and commonly used negative electrodes may be used as the negative electrode 123.

For example, any appropriate, well-known material that is a negative electrode active material capable of adsorbing and desorbing lithium ions can be used as the negative electrode active material. For example, in addition to a lithium metal or a lithium alloy (a lithium metal containing alloy such as lithium-aluminum, lithium-lead, lithium-tin, lithium-aluminum-tin, lithium-gallium, and wood's alloy), an alloy capable of adsorbing/desorbing lithium, a carbon material (for example, graphite, a non-graphitizing carbon, a graphitizable carbon, a low temperature carbon, or amorphous carbon), a metal oxide, a lithium metal oxide (for example, $Li_4Ti_6O_{12}$), or a polyphosphate compound may be used.

Moreover, the first separator 124 and the second separator 125 are long, belt-shaped separators interposed between the positive electrode 122 and the negative electrode 123. The first separator 124 includes a first layer 124a and a second layer 124b, and the second separator 135 includes a first layer 125a and a second layer 125b.

The first layers 124a and 125a are microporous sheets including a thermo plastic resin that form the base material layers of the first separator 124 and the second separator 125, respectively.

Specifically, resin porous membranes having polymer, natural, hydrocarbon, glass, or ceramic fibers that are woven or non-woven are used as the first layers 124a and 125a. Moreover, the resin porous membranes preferably have woven or non-woven polymer fibers. More particularly, the resin porous membranes preferably have polymer fibers or fleece, or are a similar textile or fleece. The polymer fiber is preferably a polyacrylonitrile (PAN), polyamide (PA), polyester, polyethylene telephthalate (PET), or a polyolefin (PO), and the polyolefin is, for example, a non-conductive polymer fiber selected from polypropylene (PP), polyethelene (PE), or a similar polyolefin composite. Moreover, the resin porous membranes may be, for example, polyolefin microporous membranes, non-woven fabric, or paper, and are preferably polyolefin microporous membranes. Polyethylene, polypropylene, or a composite thereof can be used for the porous polyolefin layer. It is to be noted that, taking into consideration its impact on battery characteristics, the first layers 124a and 125a preferably have a thickness of approximately 5 to 30 μm.

The second layers 124b and 125b are positioned above and have different material properties than the first layers 124a and 125a. According to this embodiment, the second layers 124b and 125b are heat resistant layers coated on the first layers 124a and 125a, respectively. Here, the heat resistant coated layer includes, for example, a composite of inorganic particles and a binder, or a heat resistant resin.

Inorganic particles are, specifically, particles of an inorganic material of more than one of a single component selected from the following, a compound of more than one of the following, or a composite compound of more than one of the following: an oxide such as an iron oxide, $SiO_2$, $Al_2O_3$, $TiO_2$, $BaTiO_2$, $ZrO$, or an alumina-silica complex oxide or the like, a fine particle nitride such as aluminum nitride or silicon nitride or the like, insoluble fine ionic crystal particles of calcium fluoride, barium fluoride, or barium sulfate or the like, covalent fine crystal particles of silicon or diamond or the like, fine ceramic particles of talc or montmorillonite or the like, synthetic material of or material derived from mineral resources such as boehmite, zeolite, appetite, kaolin, mullite, spinel, olivine, sericite, bentonite, or mica or the like. Moreover, the above inorganic material may be particles made to have electrical insulation properties by processing the surfaces of electrically conductive fine particles such as fine oxide particles of $SnO_2$ or tin-indium oxide (ITO) or the like, or fine carbonaceous chondrite particles of carbon black or graphite or the like, with a material having electrical insulation properties (for example, materials made from the previously described electrical insulating inorganic particles).

The binder is not particularly limited, and may be, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile butadiene rubber, polystyrene, or polycarbonate. Particularly from an electrochemical stability standpoint, the binder is preferably polyacrylonitrile, polyvinylidene fluoride, polyhexafluoropropylene, polyethylene oxide, polyacrylic acid, polymethacrylic acid, or styrene-butadiene rubber.

The material for the heat resistant resin is not particularly limited, but is a material having a higher softening point than the material included in the first layers 124a and 125a. For example, cross-linked macromolecules such as polyimide, polyamide, polyamido-imide, melamine resin, phenol resin, cross-linked polymethylmethacrylate (cross-linked PMMA), cross-linked polystyrene (cross-linked PS), polydivinylbenzene (PDVB), or benzoguanamine-formaldehyde condensate, or heat resistant macromolecules such as thermoplastic polyimide. These organic resins (macromolecules) may be a composite, modified product, derivative, copolymer (random copolymer, alternating copolymer, block copolymer, graft copolymer), or cross-linked product (when the previously stated heat resistant macromolecule) of the above recited materials.

The second layers 124b and 125b have thermal boding properties that are inferior to those of the first layers 124a and 125a. In other words, the first separator 124 has a first layer 124a on which a first surface having thermal bonding properties superior to those of the second surface is formed, and a second layer 124b on which a second surface having thermal boding properties inferior to those of the first surface is formed. Likewise, the second separator 125 has a first layer 125a on which a first surface having thermal bonding properties superior to those of the second surface is formed, and a second layer 125b on which a second surface having thermal boding properties inferior to those of the first surface is formed.

Moreover, at the innermost wind of the wound body 121 is a core 126 made from polypropylene or polyethylene or the like. The wound body 121 is formed by bonding the first separator 124 and the second separator 125 to the core 126 in a state in which the positive electrode 122, the first separator 124, the negative electrode 123, and the second separator 125 are layered in this order, and winding these four layers. The wound body 121 is wound so that the positive electrode 122 and the negative electrode 123 are not included in the outermost layer (the last wound layer). As (b) in FIG. 3 shows, the outermost layer of the wound body 121 includes the separators 124 and 125.

The at least one of the separators 124 and 125 (the first separator 124) is bonded to the insulation sheet 127 via the first layer 124a on which the first surface having the superior thermal bonding properties is formed. Moreover, the separators 124 and 125 are layered so that the first layers 124a and 125a on which the first surfaces are formed oppose each other. Moreover, the opposing first layer 124a and first layer 125a are bonded together at a first point P1. The first surface (the first layer 124a) of the first separator 124 of the two separators 124 and 125 is bonded to the insulation sheet 127 at a second point P2. The separators 124 and 125 are bonded together at the first point P1 before the insulation sheet 127 to be described later is wound around the wound body 121.

The insulation sheet 127 is wound around the outermost layer of the wound body 121, and has thermal bonding properties that are even superior to those of the first layers 124a and 125a of the first and second separators 124 and 125, on which the first surfaces having the superior thermal bonding properties are formed. Moreover, the insulation sheet 127 is wound at least one time around the outer surface of the wound body 121 and bonded to itself at a third point P3 in an overlapping area thereof. In other words, the insulation sheet 127 is bonded at one end to the first layer 124a of the first separator 124 at the second point P2, wound around the outer layer of the wound body 121 once, then bonded to itself in overlapping area of the other end at the point P3. It is to be noted that the winding direction of the insulation sheet 127 is the same as the winding direction of the wound body 121.

Figure 4A:
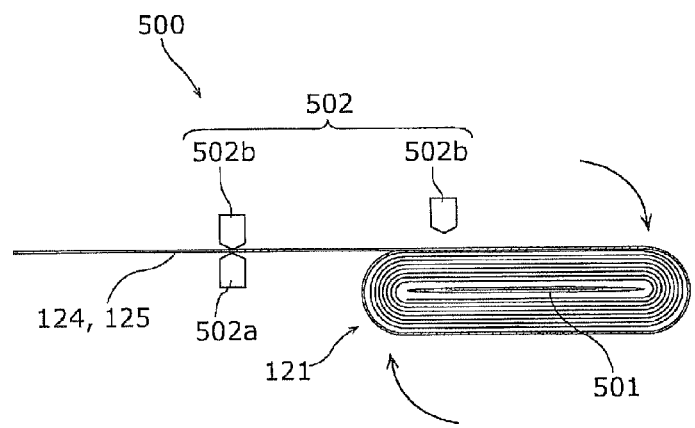
FIG. 4A shows the bonding performed at the first point and the second point by the winding apparatus.
Figure 4B:
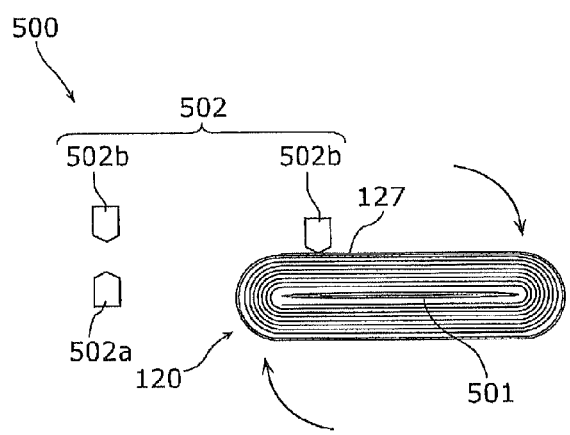
FIG. 4B shows the bonding performed at the third point by the winding apparatus.

FIG. 4A and FIG. 4B show an outline of the winding apparatus 500. FIG. 4A shows the bonding performed at the first point and the second point by the winding apparatus. FIG. 4B shows the bonding performed at the third point by the winding apparatus. The wound body 121 is manufactured using a winding apparatus 500. The winding apparatus 500 includes a winding unit 501 and a bonding unit 502. As FIG. 4 shows, the winding unit 501 winds the positive electrode 122, the negative electrode 123, and the separators 124 and 125 having surfaces with different thermal bonding properties around the core 126 acting as the winding axis by rotating while the positive electrode 122, the negative electrode 123, the separator 124, and the separator 125 are layered alternately. The bonding unit 502 includes a first bonding unit 502a and a second bonding unit 502b. The first bonding unit 502a bonds the separators 124 and 125 together at the first point P1 shown in (b) in FIG. 3, and bonds the first separator 124 and the insulation sheet 127 together at the second point P2 shown in (b) in FIG. 3. The second bonding unit 502b bonds the insulation sheet 127 to itself at the third point P3. It is to be noted that the bonding temperature set in the second bonding unit 502b is lower than the bonding temperature set in the first bonding unit 502a. This is because the insulation sheet 127 has thermal bonding properties that are even superior to those of the first layers 124a and 125a of the first and second separators 124 and 125, on which the first surfaces having the superior thermal bonding properties are formed. This makes it possible to decrease, as much as possible, the impact heat has from the bonding performed on the electrode assembly 120 by the second bonding unit 502b which performs the bonding by pressing against the electrode assembly 120.

With the energy storage device 10 according to the first embodiment, since the first separator 124, which is the at least one of the two separators 124 and 125 of the wound body 121 and has mutually different thermal bonding properties, is bonded to the insulation sheet 127 via the first layer 124a on which the first surface having the superior thermal bonding properties is formed, a state in which tension is applied to the first separator 124 at the winding end point of the wound body 121 can be easily attained. In this way, as long as one end of the insulation sheet 127, which winds around the outermost layer of the wound body 121, is thermally bonded to the first separator 124, which is the at least one of the two separators, the other end of the insulation sheet 127 can be bonded to itself after the insulation sheet 127 is wound around the wound body 121 once, and as such, a state in which tension is applied to the wound body 121 can be easily secured. For this reason, a decrease in performance in the energy storage device 10 can be inhibited.

Moreover, with the energy storage device 10 according to the first embodiment, the two separators 124 and 125 are bonded together via the first layers 124a and 125a thereof, on which the first surfaces having the superior thermal bonding properties are formed, and furthermore, the first layer 124a of the first separator 124 of the two separators 124 and 125, on which the first surface is formed, is bonded to the insulation sheet 127. In other words, the first separator 124 can be directly bonded to the insulation sheet 127, and the second separator 125 can be indirectly bonded to the insulation sheet 127 via the first separator 124. With this, the two separators 124 and 125 can be securely bonded to the insulation sheet 127.

Moreover, with the energy storage device 10 according to the first embodiment, the thermal bonding properties of the insulation sheet 127 are superior to the first layers 124a and 125a of the separators 124 and 125, on which the first surfaces having the superior thermal bonding properties among the surfaces of the separators are formed. This allows the insulation sheet 127 and the first surface of the first separator 124 to be bonded and the insulation sheet 127 to be bonded to itself at a temperature lower than the temperature required to bond the separators 124 and 125 together. This makes it possible to reduce a decrease in performance of the electrode assembly 120 caused by application of heat since the amount of heat that is applied in the bonding process to the electrode assembly 120 that is the wound electrode assembly is minimized.

Moreover, with the energy storage device 10 according to the first embodiment, the end portion of the outermost layer of the insulation sheet 127 wound around the wound body 121 is bonded to itself in an overlapping area of the insulation sheet 127. In other words, the insulation sheet 127 is bonded at one end to the first separator 124 at the second point P2, wound around the outer layer of the wound body 121 once, then bonded to the insulation sheet 127 at the other end at a third point nearer the end of the winding than the second point is. This makes it possible to securely fix the end of the wound body with the insulation sheet by winding the insulation sheet having thermal bonding properties superior to at least those of the first surface of the first layer 124a of the first separator 124 around the outermost layer of the wound body once while one end of the insulation sheet 127 is bonded to the first separator 124, and then bonding the insulation sheet to itself.

It is to be noted that with the energy storage device 10 according to the first embodiment, the insulation sheet 127 does not necessarily need to have thermal bonding properties that are greater than the first layers 124a and 125a of the first and second separators 124 and 125, on which the first surfaces having thermal bonding properties superior to those of the second surfaces are formed. Even when the insulation sheet 127 has thermal bonding properties that are merely greater than those of the second layers 124b and 125b of the first and second separators 124 and 125, on which the second surfaces having thermal bonding properties inferior to those of the first surfaces are formed, the insulation sheet 127 can be sufficiently bonded to the first layers 124a and/or 125a of at least one of the first and second separators 124 and 125.

Figure 5:
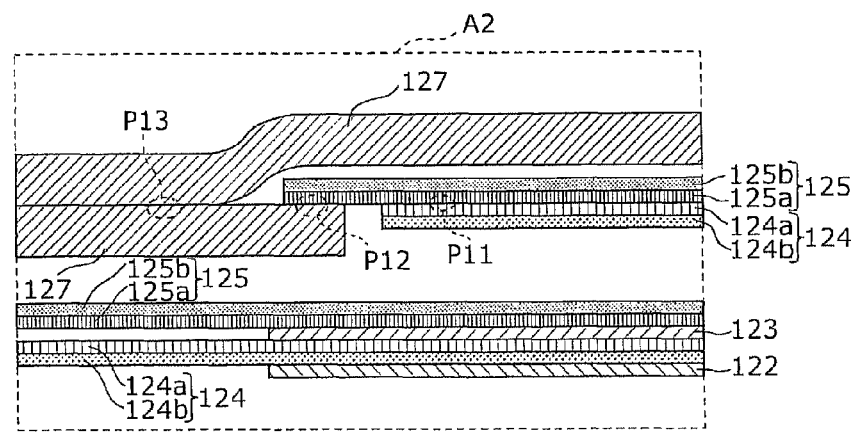
FIG. 5 is an expanded view of the portion A2 shown in (a) in FIG. 3 of the energy storage device according to a variation of the first embodiment according to the present invention.

Moreover, with the energy storage device 10 according to the above first embodiment, the first layer 124a of the first separator 124 and the first layer 125a of the second separator 125 are bonded together at the first point P1, and the first layer 124a of the first separator 124 is bonded to the insulation sheet 127 at the second point P2, but what is bonded to the insulation sheet 127 is not limited to the first separator 124, and as FIG. 5 shows, may be the second separator 125. FIG. 5 is an expanded view of the portion A2 shown in (a) in FIG. 3 of the energy storage device according to a variation of the first embodiment of the present invention. It is to be noted that even in this case, the first layer 124a of the first separator 124 and the first layer 125a of the second separator 125 are bonded together at a first point P11, and the first layer 125a of the second separator 125 having the superior thermal bonding properties is bonded to the insulation sheet 127 at a second point P12. In this case, the second separator 125 is bonded to an end of the innermost layer of the insulation sheet 127 at the second point P12 while it is sandwiched between the end of the innermost layer of the insulation sheet 127 and the insulation sheet 127 as it is wound around the outside of end of the innermost layer. It is to be noted that the insulation sheet 127 is bonded to itself at a third point P13 in an overlapping area of the insulation sheet 127 after it has been wound around the outermost layer of the wound body 121 once.

Second Embodiment

Figure 6:
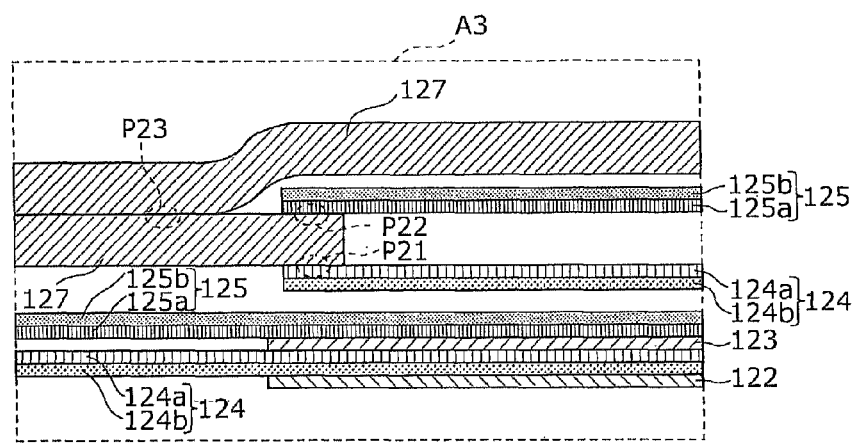
FIG. 6 is an expanded view of the portion A2 shown in (a) in FIG. 3 of the energy storage device according to the second embodiment of the present invention.

FIG. 6 is an expanded view of the portion A2 shown in (a) in FIG. 3 of the energy storage device 20 according to the second embodiment of the present invention. The energy storage device 20 according to the second embodiment is different from the energy storage device 10 according to the first embodiment in that the bonding points of the two separators 124 and 125 and the insulation sheet 127 are in different positions. Other configurations of the energy storage device 20 are not shown in FIG. 6 but are similar to the energy storage device 10 according to the first embodiment. As such, explanations thereof will be omitted.

As FIG. 6 shows, in the energy storage device 20 according to the second embodiment, the first layers 124a and 125a of the separators 124 125 on which the first surfaces are formed are bonded to the insulation sheet 127 while the end portion of the insulation sheet 127 is sandwiched between the separators 124 and 125. Specifically, the first separator 124 and the second separator 125 are layered so that the first surfaces thereof oppose each other, and so that the end portion at the innermost layer of the insulation sheet 127 is sandwiched by the first separator 124 and the second separator 125 at the end portion at the outermost layer. In this state, first layer 124a of the first separator 124, on which the first surface is formed, is bonded to an inner surface of the insulation sheet at a first point P21, and the first layer 125a of the second separator 125, on which the first surface is formed, is bonded to an outer surface of the insulation sheet at a second point P22. In this way, the insulation sheet 127 whose end portion at the innermost layer is bonded to the first separator 124 and the second separator 125 is wound around the wound body 121 once, and the insulation sheet 127 on the inside and the insulation sheet 127 on the outside are bonded together at a third point P23.

With the energy storage device 20 according to the second embodiment, the separators 124 and 125 are bonded to the insulation sheet 127 while the first layers 124a and 125a of the separators 124 and 125 on which the first surfaces having the superior thermal bonding properties are formed sandwich the insulation sheet 127. Consequently, the separators 124 and 125 can be securely bonded to the insulation sheet.

Variant Embodiment

In the above first and second embodiments, two separators, 124 and 125, are used in the electrode assembly 120, but the number of separators is not limited to two. A single separator may be used. It is to be noted that when a single separator is used, the separator is configured as if one lengthwise-side the two separators 124 and 125 were connected together. In other words, a single separator is folded in half, and one of the positive electrode 122 and the negative electrode 123 is inserted (sandwiched) in the fold.

In the above first and second embodiments, the insulation sheet 127 is wound at least once around the outer surface of the wound body 121, and bonded to itself at a third point P3, P13, or P23 on the outermost layer of the insulation sheet 127 in an overlapping area thereof, but the fixing thereof is not limited to bonding. The insulation sheet 127 may be fixed using a method other than thermal bonding, such as an adhesive tape having at least one adhesive surface. It is to be noted that when adhesive tape or the like is used for the fixing, since bonding is not necessary at the third point P3, P13, or P23, heat from thermal bonding is not transferred to the electrode assembly 120. This makes it possible to minimize the effects from heat on the electrode assembly 120. Moreover, when the insulation sheet 127 is not used, even when the outermost end of the separator is fixed to the inner separator with adhesive tape, from the perspective of the adhesive properties between the adhesive tape and the separator, the first surface of the separator having the superior thermal bonding properties and the adhesive surface of the adhesive tape may be fixed by coming in contact.

Hereinbefore, the energy storage device according to the present invention has been described based on the exemplary embodiments, but the scope of the present invention is not intended to be limited thereto. Various modifications of the exemplary embodiment as well as embodiments resulting from arbitrary combinations of constituent elements of different exemplary embodiments that may be conceived by those skilled in the art are intended to be included within the scope of the present invention as long as these do not depart from the essence of the present invention.

The invention claimed is:

1. An energy storage device, comprising:
   a wound body including a positive electrode, a negative electrode, and a separator which are layered and wound, the separator being interposed between the positive electrode and the negative electrode and including a first surface and a second surface, the first surface having thermal bonding properties superior to thermal bonding properties of the second surface; and
   an insulation sheet wound around an outermost layer of the wound body,
   wherein the separator is bonded to the insulation sheet via the first surface thereof.

2. The energy storage device according to claim 1, wherein the separator comprises two separators, and
   wherein the separators are bonded together via the first surfaces thereof, and the first surface of one of the separators is bonded to the insulation sheet.

3. The energy storage device according to claim 1, wherein the first surface of the separator is bonded to the insulation sheet in a state in which an end portion of the insulation sheet is sandwiched by the separator.

4. The energy storage device according to claim 2, wherein the first surface of each of the separators is bonded to the insulation sheet in a state in which an end portion of the insulation sheet is sandwiched by the separators.

5. The energy storage device according to claim 1, wherein the insulation sheet is wound at least once around an outer surface of the wound body and bonded to itself in an overlapping area.

6. The energy storage device according to claim 1, wherein the insulation sheet includes a material having thermal bonding properties superior to the thermal bonding properties of the first surface.

7. The energy storage device according to claim 1, wherein the separator comprises two separators, and
   wherein the two separators are bonded together before the insulation sheet is wound around the wound body.

8. The energy storage device according to claim 1, wherein the separator includes a base material layer and a heat-resistant layer including inorganic particles,
   wherein the base material layer forms the first surface, and wherein the heat-resistant layer forms the second surface.

9. An energy storage device, comprising:
   a wound body including a positive electrode, a negative electrode, and a separator which are layered and wound, the separator being interposed between the positive electrode and the negative electrode and including a first surface and a second surface, the first surface having thermal bonding properties superior to thermal bonding properties of the second surface; and
   an adhesive tape which fixes an end of an outermost layer of the wound body,
   wherein an adhesive surface of the adhesive tape and the first surface of the separator are fixed together by contact.

10. A winding apparatus, comprising:
    a winding unit configured to wind a positive electrode, a negative electrode, and a separator including surfaces with different thermal bonding properties in a state in which the positive electrode, the negative electrode, and the separator are layered alternately; and
    a bonding unit configured to perform a bonding according to claim 1.

11. A winding method, comprising:
    winding a positive electrode, a negative electrode, and a separator including surfaces with different thermal bonding properties in a state in which the positive electrode, the negative electrode, and the separator are layered alternately; and
    performing a bonding according to claim 1.

12. The energy storage device according to claim 1, further comprising:
    a container that holds the wound body,
    wherein the insulation sheet is disposed between the container and the wound body.

13. The energy storage device according to claim 1, wherein the separator is thermal bonded to the insulation sheet via the first surface.

14. The energy storage device according to claim 1, wherein the separator and the insulation sheet are fixed together.

15. The energy storage device according to claim 1, wherein a thickness of the insulation sheet is more than a thickness of the separator.

16. The energy storage device according to claim 1, wherein the insulation sheet is exposed at an outermost layer of the insulation sheet.

17. The energy storage device according to claim 1, further comprising:
    a core provided at an innermost wind of the wound body,
    wherein the wound body is arranged by bonding the separator to the core such that the positive electrode, the separator, the negative electrode, and the separator are disposed in this order.

18. The energy storage device according to claim 9, further comprising:

a container that holds the wound body,
wherein the adhesive tape is disposed between the container and the wound body.

19. The energy storage device according to claim 9, further comprising:
a container that holds the wound body; and
an insulation sheet disposed between the container and the wound body.

20. The energy storage device according to claim 9, further comprising:
a core provided at an innermost wind of the wound body,
wherein the wound body is arranged by bonding the separator to the core such that the positive electrode, the separator, the negative electrode, and the separator are disposed in this order.

* * * * *